United States Patent [19]

Schiff et al.

[11] 4,343,543

[45] * Aug. 10, 1982

[54] MULTIPLE IMAGE ROLL FILM CAMERA

[75] Inventors: Otto M. Schiff, Irvine; Vitolds Rikis, Mission Viejo, both of Calif.

[73] Assignee: Schiff Photo Mechanics, Santa Ana, Calif.

[*] Notice: The portion of the term of this patent subsequent to Aug. 25, 1998, has been disclaimed.

[21] Appl. No.: 265,154

[22] Filed: May 19, 1981

Related U.S. Application Data

[63] Continuation-in-part of Ser. No. 157,674, Jun. 9, 1980, Pat. No. 4,285,587.

[51] Int. Cl.³ .................... G03B 29/00; G03B 1/00; G03B 27/42; G03B 27/70
[52] U.S. Cl. .................... 354/124; 346/110 R; 355/29; 355/53; 355/66
[58] Field of Search .................... 354/124, 75, 76; 355/53, 66, 28, 29; 346/110 R

[56] References Cited

U.S. PATENT DOCUMENTS

| | | |
|---|---|---|
| 1,112,414 | 9/1914 | Jones et al. |
| 1,114,672 | 10/1914 | Beidler |
| 1,454,043 | 5/1923 | Dodge |
| 1,725,966 | 8/1929 | Peden |
| 2,282,427 | 5/1942 | Powers ............... 95/34 |
| 2,287,271 | 6/1942 | Powers ............... 95/34 |
| 2,298,574 | 10/1942 | Lockhart ............... 242/71 |
| 2,420,046 | 5/1947 | Loeb ............... 95/31 |
| 2,478,301 | 8/1949 | Mourfield ............... 95/18 |
| 2,533,099 | 12/1950 | Earhart ............... 95/31 |
| 2,910,924 | 11/1959 | Bouwers ............... 95/31 |
| 2,975,691 | 3/1961 | Zoglmann et al. ............... 95/31 |
| 3,460,453 | 8/1969 | Gold ............... 95/14 |
| 3,499,376 | 3/1970 | Swift ............... 95/31 |
| 3,557,675 | 1/1971 | Koll et al. ............... 95/14 |
| 3,631,781 | 1/1972 | Kennington et al. ............... 95/14 |
| 3,640,198 | 2/1972 | James ............... 355/28 X |
| 3,674,367 | 7/1972 | Chapman ............... 355/29 X |
| 4,139,292 | 2/1979 | Chiesa ............... 354/109 |
| 4,285,587 | 8/1981 | Schiff et al. ............... 354/124 |

FOREIGN PATENT DOCUMENTS 1011936 12/1965 United Kingdom ............... 355/29

Primary Examiner—Donald A. Griffin
Attorney, Agent, or Firm—Gausewitz, Carr, Rothenberg & Edwards

[57] ABSTRACT

A multiple image camera sequentially exposes upon a section of a roll film a number of images of an oscilloscope that displays images of a patient subjected to a scanning device. The oscilloscope, together with a folded optical system, is mounted to move bidirectionally transversely of the film which itself is transported bidirectionally so as to enable multiple exposures of the oscilloscope in different arrays on the film. After exposure of a selected number of images, the exposed film section is cut and a previously disengaged transport mechanism drives the cut film section into a detachable cassette.

31 Claims, 11 Drawing Figures

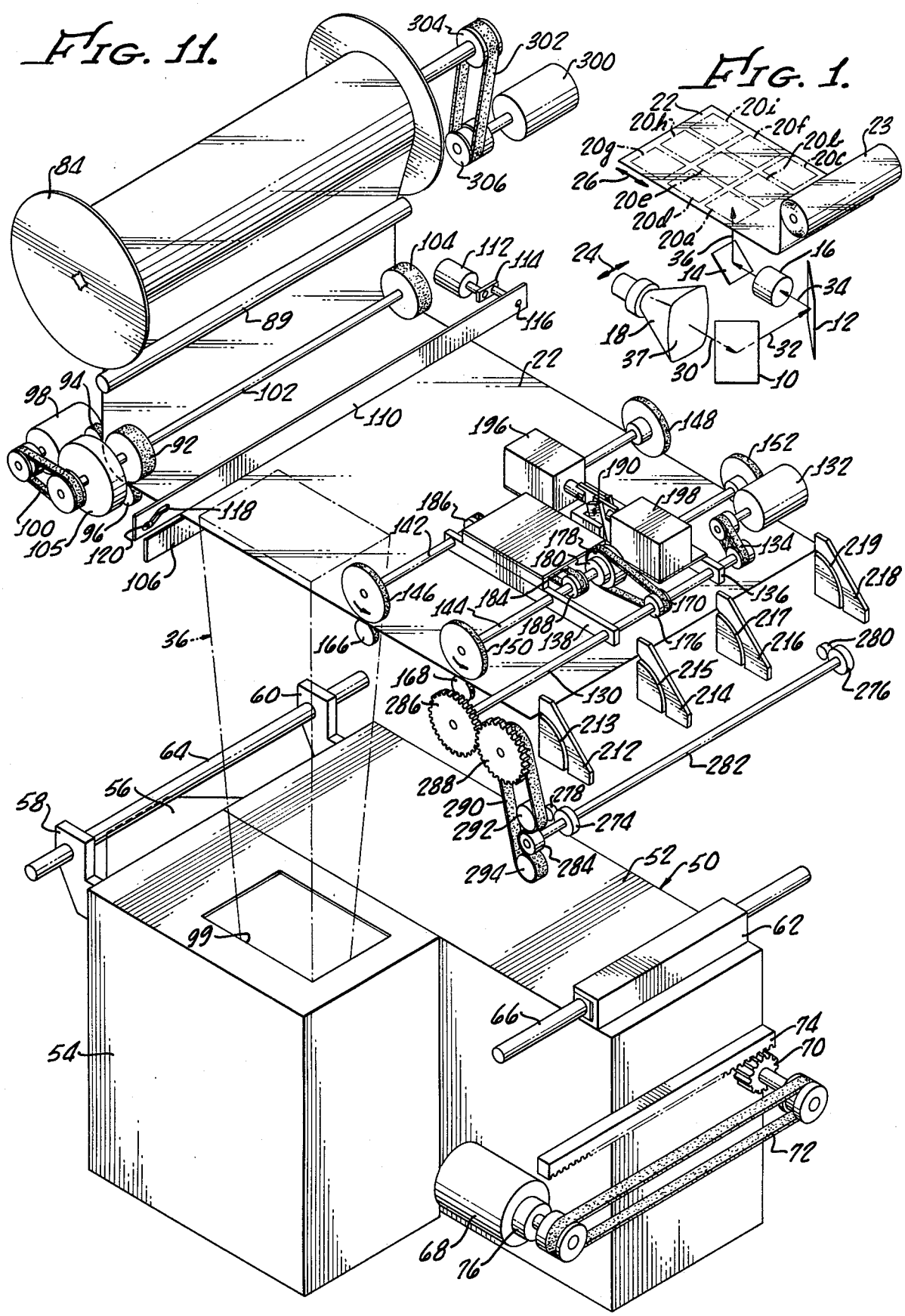

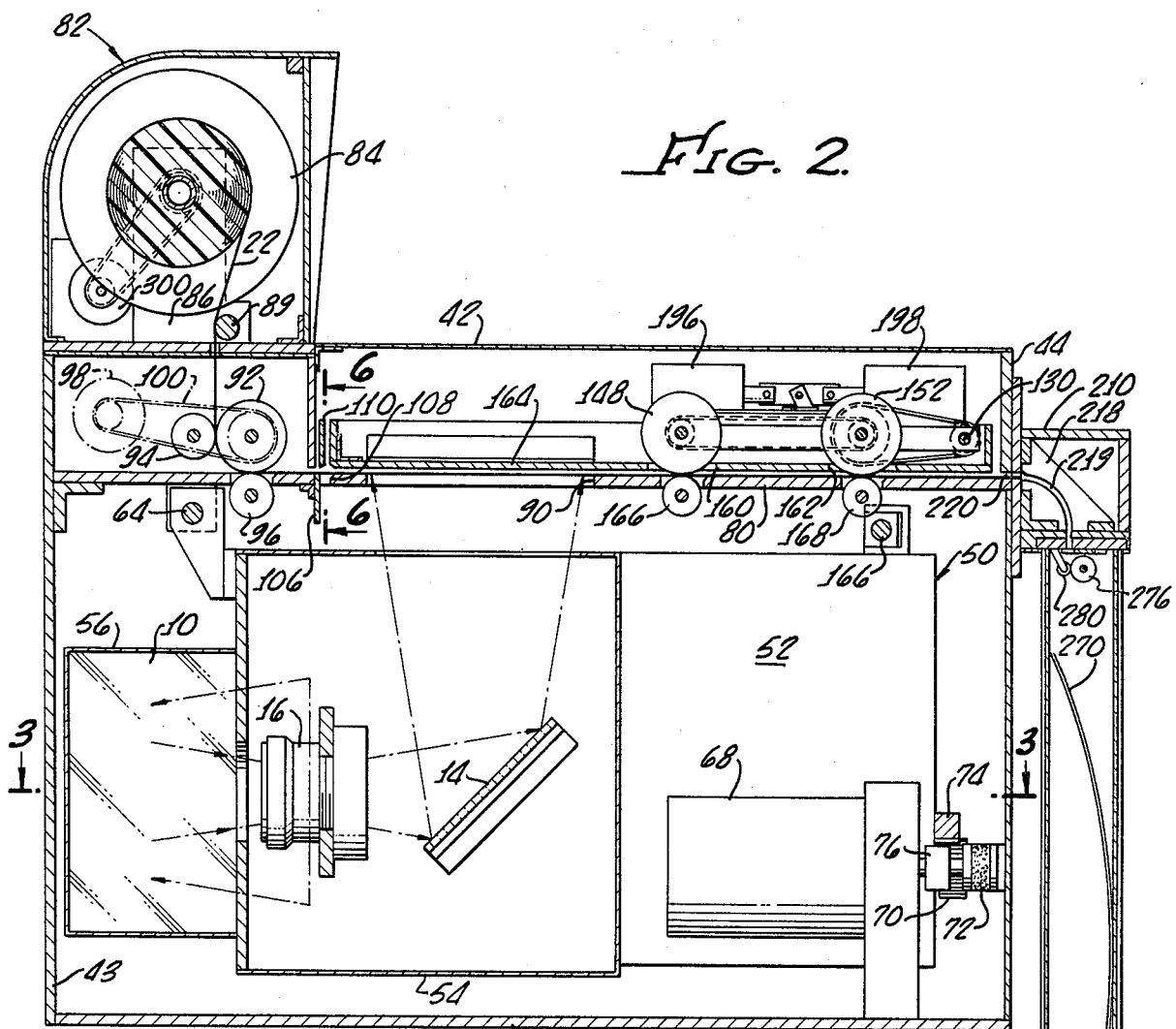
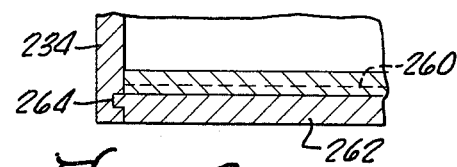
FIG. 9.
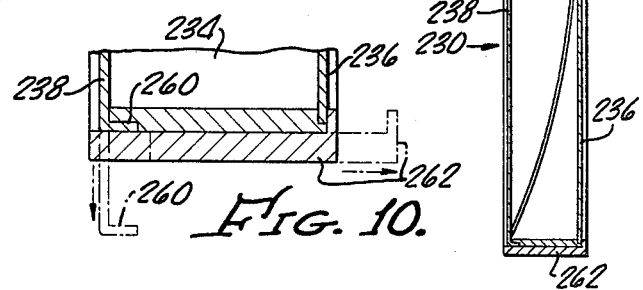
FIG. 10.
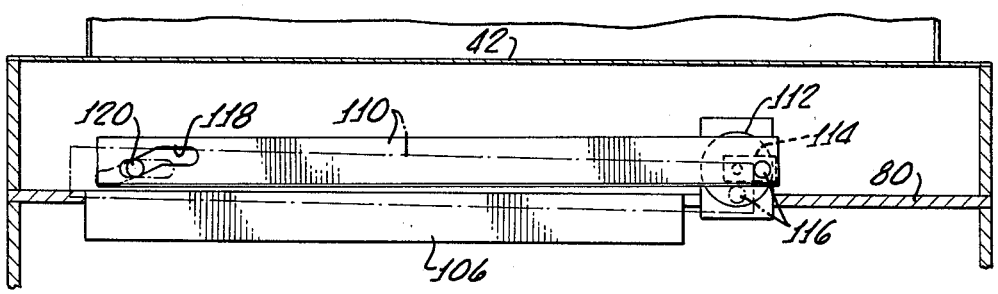
FIG. 6.

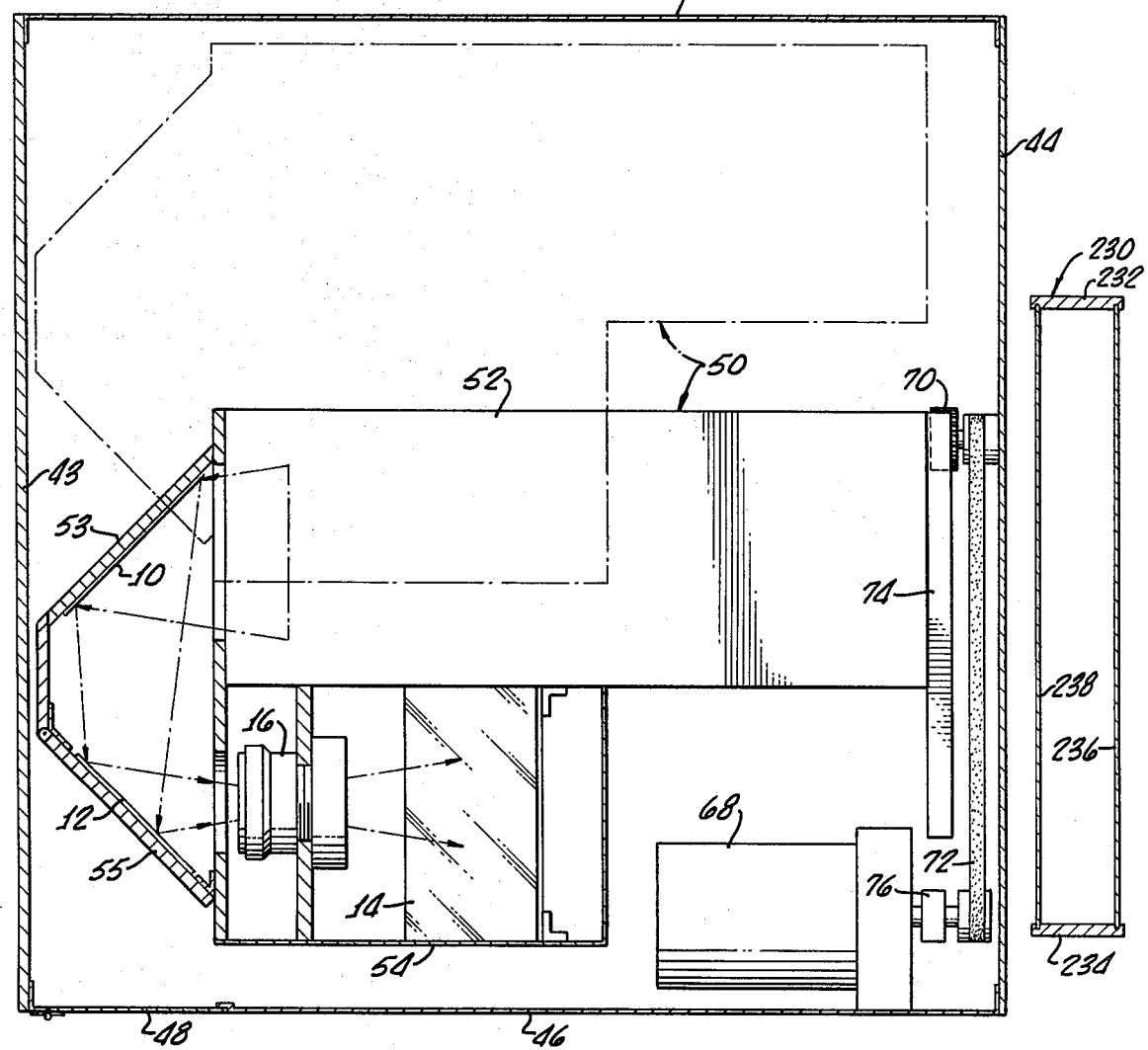
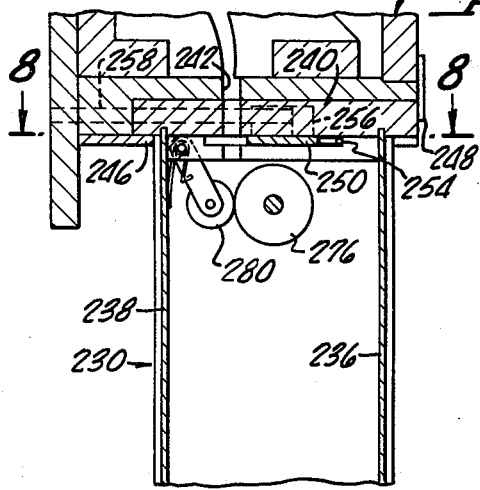
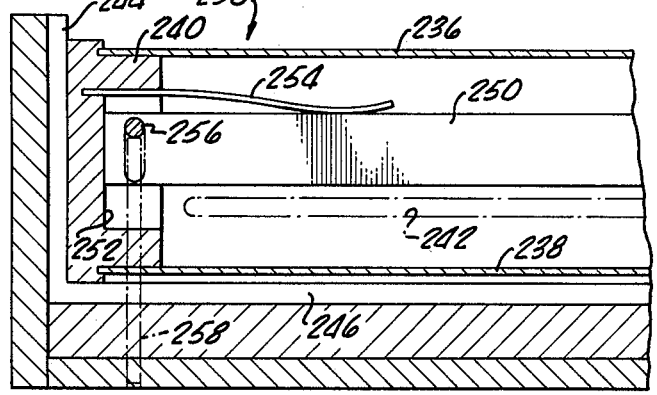

MULTIPLE IMAGE ROLL FILM CAMERA

This application is a continuation-in-part of application Ser. No. 157,674, for Compact Multiple Image Camera, filed June 9, 1980 now U.S. Pat. No. 4,285,587 issued Aug. 25, 1981. The disclosure of said application in Ser. No. 157,674 is incorporated by reference as though fully set forth herein.

BACKGROUND OF THE INVENTION

In our prior application, Ser. No. 157,674 there is described a compact multiple image camera in which a number of images of an oscilloscope or video monitor are formed on a rectangular cut film sheet carried in a film holder. The film holder is mounted behind the oscilloscope screen, in a plane perpendicular to the screen, and a folded optical path directs light from the oscilloscope screen along an output optical axis behind the screen and generally parallel to the screen.

This arrangement, having many advantages because of ease of handling and compact size, nevertheless still requires the use of cut sheet film and a film holder for each group of images to be made. Individual film sheets must be loaded into and out of the film holder and the cut film must be handled and transported in individual holders. The holders are costly, time consuming to handle, are damaged by improper handling, and become worn after multiple use or misuse. Further, a camera made to handle a film sheet of a given size is generally incapable of handling film of other sizes without significant modification of the camera or film holder. A common film size is 8"×10", though other sizes are frequently desired and used. Generally a camera initially arranged to accept a film holder for 8"×10" film cannot handle a film of 11"×14", for example. Further, different size film holders usually are required for each different size of cut sheet film.

Accordingly, it is an object of the present invention to provide a multiple image camera that avoids or minimizes above-mentioned problems.

SUMMARY OF THE INVENTION

In carrying out principles of the present invention in accordance with a preferred embodiment thereof, an image formed on an oscilloscope screen is transmitted along an output axis behind the screen and generally parallel to the screen and the oscilloscope is mounted for motion in a first direction transverse to the output axis. Film from a supply roll is transported in a second direction transverse to the output axis by metering drive means and, after exposure, is cut along a line positioned between the metering drive means and the output axis. Cut film transport means are provided to shift the exposed film, but are maintained free of contact with the film during exposure. A detachable cassette for receiving exposed film has drive means therein to insure full insertion of each cut sheet into the cassette.

BRIEF DESCRIPTION OF THE DRAWINGS

FIG. 1 is a schematic representation of major components of a multiple image roll film camera embodying principles of this invention;

FIG. 2 is a vertical longitudinal section of a multiple image camera and video monitor embodying principles of the present invention;

FIG. 3 is a horizontal section taken on lines 3—3 of FIG. 2;

FIG. 6 is a section taken on line 6—6 of FIG. 2 showing the film cutter;

FIG. 7 is a section showing part of the exit housing and cassette entrance;

FIG. 8 is a section taken on lines 8—8 of FIG. 7;

FIGS. 9 and 10 are fragmentary sectional views of the cassette cover latch, and

FIG. 11 is a schematic perspective showing portions of the camera.

DETAILED DESCRIPTION

Figure 4:
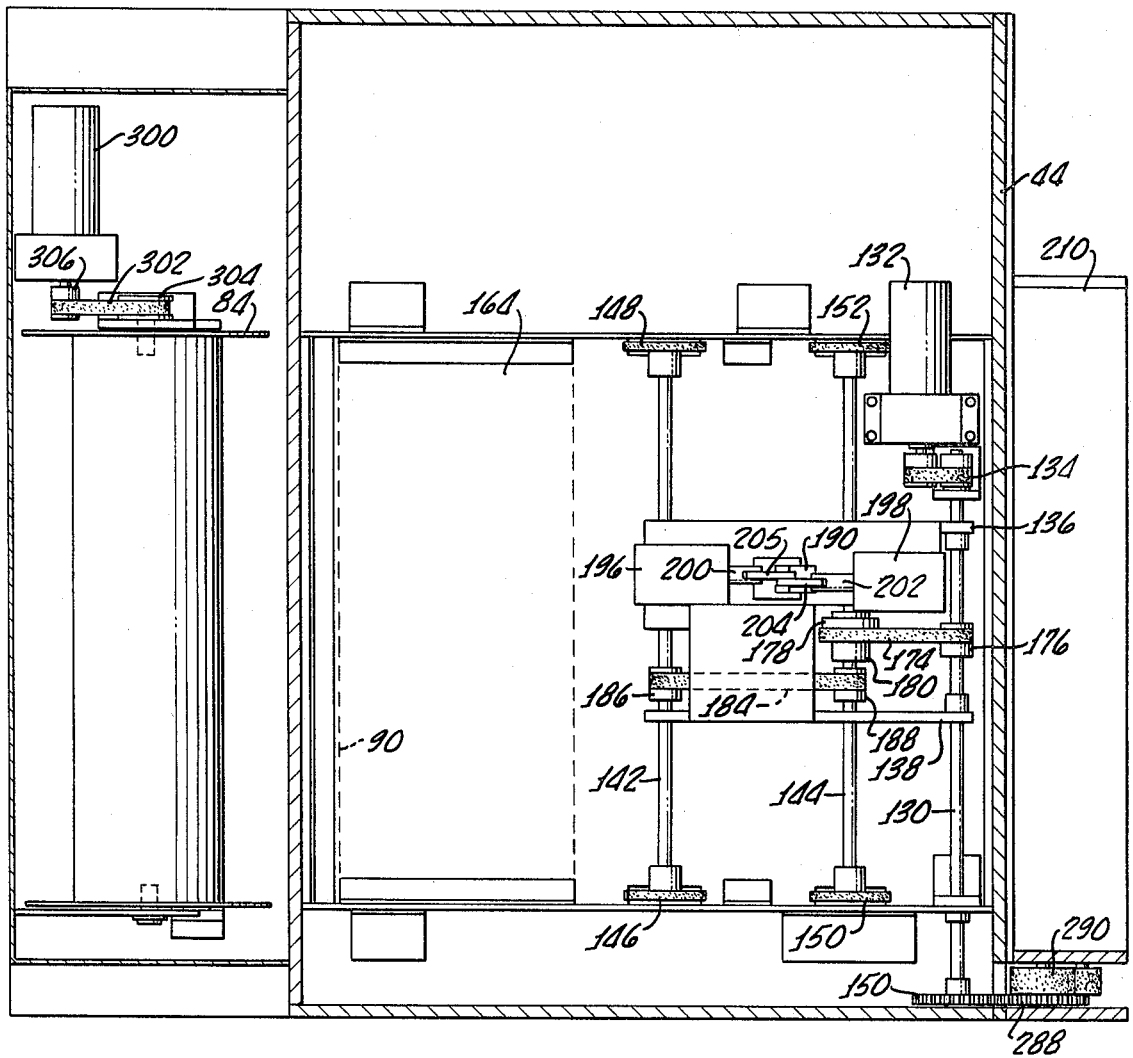
FIG. 4 is a plan view with the housing top removed.

A multiple image camera embodying principles of the present invention is arranged to rest upon a table top or other suitable horizontal support, and to have all parts within a camera housing that is not much greater in each of three dimensions than the video monitor that provides the display of which multiple photographic images are to be made upon a section cut from a roll of film. Because a roll of film is used and a section of the film cut after exposure, a great variety of film formats may be employed. For example, with an eleven inch wide roll of film, film sections after exposure and cutting may be 8"×11", 11"×14", or other lengths of the 11" wide film as may be desired. Various numbers and sizes of images may be positioned on a single sheet of film. Yet, even though film is supplied from a roll with all the advantages attendant thereon, exposed images are immediately available for processing and study. There is no need to wait for exposure of a complete roll since the exposed portion of the film is readily cut after the desired number of exposures.

As schematically illustrated in FIG. 1, a folded optical path including three mirrors 10, 12 and 14, and an interposed lens 16, is provided in an optical system that is fixedly mounted to a video monitor 18 so as to pass the image of a display on the face of the monitor to a selected one of a number of areas 20a–20i on a section 22 of film drawn from a film supply roll 23. The optical system and video monitor are mounted in a camera housing (not shown in FIG. 1) for bidirectional transverse motion as indicated by arrow 24. The roll film is mounted for bidirectional motion along the film length, in the direction indicated by arrow 26, relative to the camera housing and relative to the oscilloscope and optical system. The monitor schematically indicated at 18 is longitudinally elongated in the direction of arrow 26 and the mirrors 10, 12 and 14 are spaced and oriented to provide a folded optical path having a first horizontal leg 30, a second horizontal leg 32, a third rearwardly directed horizontal leg 34 and an output axis or output leg 36 directed vertically upwardly and positioned rearwardly of and to the side of the screen 37 of the monitor 18. Accordingly, the longitudinally movable roll film may be moved in either of its longitudinal directions to position areas such as 20a, 20d or 20g, etc. at the output optical axis. Similarly, the monitor 18, together with its optical system, can be moved transversely in the direction of arrow 24 to center the output optical path leg 36 upon any one of areas 20a, 20b, 20c, etc. It will be readily understood that the illustrated nine image format is merely exemplary of many that may be employed. However, it is often desirable to vary the sequence of exposure so that it is necessary, for certain image arrangements, to enable both the film and the monitor with its optics to move bidirectionally.

The monitor is shown oriented with the longer dimension of its screen vertical and the folded optical path arranged to bend around the side of the monitor. Obviously other arrangements and orientations may be employed, with the monitor turned at ninety degrees, for example, and the optical path bent around either side, top or bottom of the monitor, to provide the rearwardly positioned output optical axis.

FIG. 2 shows the components schematically shown in FIG. 1 mounted in a lightweight compact camera housing having a bottom 41, a top 42, sides 43 and 44 (FIG. 3), a back 45 and a front panel 46 on which may be mounted camera controls not shown and a viewing access door 48. A video monitor and optical system housing 50 (FIG. 11) includes a substantially rectangular monitor mounting section 52, a rectangular lens and exposure aperture section 54 and a truncated pyramidal optical turning section 56. Mirrors 10 and 12 are mounted on walls 53, 55 of turning section 56, wall 55 forming a pivotally mounted access door to permit direct viewing of the monitor screen via mirror 10 and door 48. Housing 50 has fixed brackets 58, 60 at one side and an elongated channel shaped fixed bracket 62 at the other which slidably receive rods 64, 66 that are fixedly mounted in the camera housing. This enables transverse motion of the monitor and optical system, which are driven by means of a fixed motor 68 driving a pinion 70 through a drive belt 72. Pinion 70 meshes with a rack 74 fixedly carried by one side of the monitor housing section 52. Position encoder 76 provides an electrical signal representing transverse position of the monitor.

A partition 80 (FIG. 2) extends horizontally across the camera housing and divides the housing into a lower chamber, in which is mounted the monitor and optical system, and an upper chamber, in which is mounted the film and film transport. In an upper section 82 of the upper chamber is a film spool 84, removably mounted in a conventional fashion on brackets such as bracket 86. Film 22 is drawn from the spool past a guide roller 89 and around a metering roller 92. The film is pressed against the metering roller by resiliently mounted pressure rollers 94, 96 spaced around the periphery of the metering roller to insure contact of the film over a substantial area of the metering roller so as to minimize slippage. Metering roller 92 is driven from a fixed motor 98 and a belt 100 that is entrained around a pulley on the metering roller shaft. As can best be seen in FIG. 11, metering roller 92 is positioned to engage one edge of the film and is mounted on a shaft 102 extending across the film and carrying at its remote end a second driven metering roller 104. A shaft position encoder 105 is fixed to metering roller shaft 102 to provide an output electrical signal representing the longitudinal position of the film.

Film is driven from the metering rollers along the upper surface of the partition plate 80 and over a transversely elongated exposure aperture 90 (see FIG. 4) in the partition plate. Aperture 90 is centered (in the direction of film travel) on the output axis of the optical system directly above the center of the third or output axis turning mirror 14, and directly above an output aperture 99 formed in the upper end of exposure aperture section 54.

Between the exposure aperture 90 and metering rollers 92, 104 is mounted a film cutter arranged to cut film 22 across the complete width of the film. The cutter includes a fixed knife or anvil 106 mounted below the partition plate and extending through an aperture 108 therein for cooperating with a movable blade 110 best shown in FIG. 6. The cutter is driven by a motor 112 that rotates a crank 114 fixed to the motor shaft and having an end thereof pivotally connected at pivot 116 to one end of the blade 110. The other end of the blade has an angulated inclined slot 118 formed therein which receives a fixed cam pin 120. As the motor 112 rotates, the pivot point 116 between the crank arm 114 and the blade traverses a circle around the motor shaft, shifting the blade longitudinally and raising and lowering the end connected to the motor and crank arm. Pin and slot 118, 120 allow the blade to shift longitudinally and at the same time also change its elevation so the entire blade moves both longitudinally and vertically to achieve a complete severing of the film in one revolution of the motor 112 and crank arm 114.

A shaft 130 is journaled within the upper or film chamber and driven by a fixed motor 132 and drive belt 134, this drive being independent of the film metering drive. Pivotally mounted on the shaft 130 is a transporter frame comprising first and second mutually spaced bars 136, 138 which are interconnected by shafts 142 and 144 which are journalled therein and extend therethrough from side to side of the film. Fixed on the respective opposite ends of shafts 142, 144 are transport rollers 146, 148, 150, 152. The rollers extend through apertures such as apertures 160, 162 (FIG. 2) at the side edges of a film guide and cover plate 164 that is spaced close to but slightly above the partition plate 80. Plate 164 is fixedly mounted within the upper chamber of the camera housing to help guide and hold the film flat and parallel to the imaging plane.

Cooperating with the transport rollers 146, 148, 150 and 152 are four pressure rollers of which only those shown at 166 and 168 are illustrated in FIG. 2. These rollers extend through appropriate apertures in the partition plate to bear against the film interposed between the pressure rollers and transport rollers and firmly grip this film. In order to insure that the film lies in the proper plane, pressure rollers 166 are positioned to extend to but not above the upper surface of partition plate 80 upon which the film rides.

Transport roller shaft 144 is driven by means of a belt 170 entrained over pulleys 176, 178 on shafts 130 and 144 respectively. Pulley 178 is coupled with shaft 144 through an override clutch 180 for purposes to be described below. Transport roller shaft 142 is driven from shaft 140 by a belt 184 and pulleys 186, 188 mounted on shafts 142 and 144 respectively.

Figure 5:
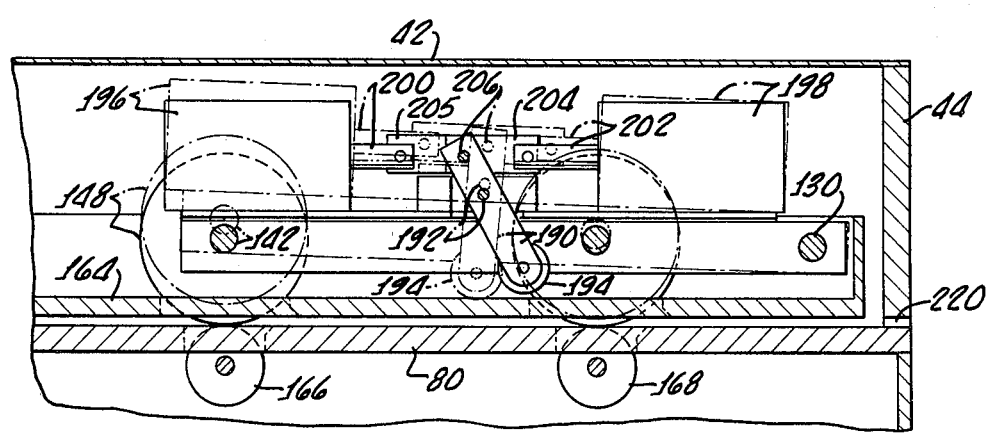
FIG. 5 is an enlarged section of a part of the camera showing the disengagable film transport mechanism.

In order to maintain the film free of drag of the film transport rollers during the metering drive of the film to position a specified portion of the film on the output optical axis, the transport rollers are temporarily disengaged from the film. After a section of the film has been completely exposed with a selected number and array of multiple images, this section of the film is severed and a forward portion thereof engaged by the transport rollers is driven from the exposure aperture. To enable the transport rollers to selectively engage and to be disengaged from the film, the transport frame is movable, as illustrated in FIG. 5, from the position shown in solid lines, wherein the rollers are urged (by gravity) downwardly toward the pressure rollers 166, 168, and an upper position, shown in dotted lines wherein the rollers 148, 152 are raised a distance sufficient to clear the film.

To achieve this motion a bifurcated lever 190 is pivoted to the transporter frame at a pivot point 192 and carries at its lowermost end a wheel 194 having an outer bearing surface that is spaced from pivot point 192 by a distance greater than the distance from the pivot point to the upper surface of film guide and cover plate 164. First and second solenoids 196, 198 are mounted on the transporter frame and each has a driven rod 200, 202 connected to opposite ends of pivotal drive bars 204, 205 which, in turn, are both pivoted at point 206 to and between the uppermost ends of the bifurcated lever 190. Each solenoid, when energized, exerts a strong pull on the upper end of the lever arm. Accordingly, when the solenoids are energized, one at a time, lever 190 moves between the first (transport engaged) position indicated in solid lines (with lever wheel 194 positioned to the right of dead center as viewed in FIG. 5) and the second (transport disengaged) position, indicated in dotted lines, with the lever wheel 194 to the left of dead center. Clockwise pivotal motion of the lever is limited so that in the transport disengaged position, with the lever wheels to the left of dead center, the lever extends at a relatively small angle with respect to a normal to the surface of the film cover and guide plate. Accordingly, in this position the entire transporter frame pivots in a clockwise direction (as viewed in FIG. 5) about shaft 130. When solenoid 196 is energized the upper end of the lever is pulled to the left to pivot the lever counterclockwise and extend it at a significantly greater angle, an angle sufficiently great to engage the transport rollers with the film, causing the surface of lever wheel 194 to be spaced above the upper surface of the film guide and cover plate. In this position the weight of the transporter frame and its solenoid drive mechanism is taken by the transport rollers 148, 152, etc and the pressure rollers 166, 168 which, accordingly, firmly grasp the interposed edges of the film.

A significant advantage of the described mechanism for engaging and disengaging the transporter wheels is the fact that the mechanism may be moved between its positions with application of but a single short duration electrical pulse applied to one or other of the solenoids. The over center arrangement of the lever insures that gravity and the weight of the transport mechanism itself will hold it in either position, although other arrangements, such as springs or the like may be used either together with or instead of the gravity arrangements. Accordingly, no electrical power is employed when the transport rollers are in disengaged position and film is being exposed, wherefore there is less chance of creation of spurious electrical signals to interfere with the film exposure or metered motion.

Fixed to the side of the camera housing adjacent one end of the partition plate is a film exit housing 210 having a plurality of transversely spaced guide plates 212, 214, 216 and 218 (FIG. 11) each of which is formed with an arcuate film guide slot 213, 215, 217 and 219 having an entrance aligned with an exit aperture 220 formed in the side of the camera housing. Upper edges of the two inner slots 215 and 217 have a smaller radius of curvature than corresponding edges of the two outer slots 213 and 219 to restrict tendency of the exposed section of film to bow transversely.

A cassette 230 is detachably connected to the camera housing to provide a light-tight film receiving compartment into which exposed and cut film sections are inserted and stored so that these film sections may be processed as desired while other portions of the film of the supply roll have not yet been exposed. Film cassette 230 is formed of a pair of sidewalls 232, 234 having inwardly facing longitudinally extending slots in which are mounted a fixed back plate 236 and a slidably removable front plate or cover 238. The cassette includes a fixed top plate 240 (FIG. 7) having a film entrance slot 242 in registry with the slots 213, 215, 217 and 219 of the exit housing. Top 240 provides an overhanging flange extending outwardly from the cassette and is slidably received within and above projecting flanges 244, 246 (FIGS. 7 and 8) to secure the cassette to the housing. A suitable latch such as a slide plate 248 may be mounted to the exit housing 210 to selectively overlap cassette top 240 and lock the cassette in position.

To insure a light-free compartment within the cassette upon withdrawal of the cassette from the exit housing, the top of the cassette slidably mounts a transversely extending entrance cover 250 within a transversely extending slot 252. Plate 250 is urged toward the camera housing by a pair of spring elements of which only that identified at 254 is shown in FIG. 8, there being a similar spring (not shown) at the other end of cover 250. Cover 250 fixedly carries an upstanding pin 256 and a similar pin (not shown) on its other end which are adapted to be engaged with a pin 258, and a similar pin (not shown) on the other side of the exit housing, that are fixedly mounted in the exit housing and extend through horizontal openings in the cassette top 240 as the cassette is being connected to the camera housing. As the cassette and its cover 240 are slidably pushed toward the camera housing along the flanges 244 and 246, pins 258 engage pins 256 to slide the cassette entrance cover rearwardly against the urging of springs 254. As the cassette is removed from the exit housing the springs drive the entrance cover plate 250 forwardly to cover the cassette entrance slot.

As shown in FIGS. 9 and 10, the cassette front wall 238 is removable by sliding downwardly in the sidewall slots of the cassette. To insure a light-seal for this removable cassette cover 238 it is formed with an inwardly projecting flange 260 at its lower end which is adapted to be overlapped by a slidable lock plate 262 that is slidably mounted in transverse slots 264 in the cassette sidewalls 232 and 234. Lock plate 262 not only locks the cover 238 in position but enhances the light seal by providing a form of labyrinth light sealing path at the lower edge of the cassette.

An exposed and severed film sheet section 270 (FIG. 2) is readily stored within the interior of the cassette. The severed film tends to bow, as illustrated, and, because of the inherent stiffness of the film additional severed sections of film cannot simply be inserted into the cassette to be fully positioned by gravity. To insure full insertion of additional bowed film sections a cassette drive is provided adjacent the cassette film entrance in the form of cassette driver rollers 274, 276 (see FIG. 11) and cooperating pressure rollers 278, 280, all mounted and journaled within the cassette. Rollers 274, 276 are mounted on a shaft 282 which extends to the side of the cassette and carries a cassette drive roller 284.

Transport roller shaft 130, mounted in the camera housing, fixedly carries a gear 286 in mesh with a gear 288 also journalled in the camera housing. Gear 288 carries a pulley around wich is entrained a belt 290 which is also entrained over a pair of mutually spaced rollers 292, 294 journaled in the camera housing at one side of the cassette. Cassette drive roller 284 extends laterally outwardly from the side of the cassette and is adapted to be received in a slot (not shown) in the camera housing so as to be positioned between rollers 292, 294, pressing against the driven belt 290, as the cassette is slid into place upon the camera housing. Accordingly, the cassette may be readily attached or detached, connecting or disconnecting its power source (roller 284 and belt 290) and yet contains a film drive that grasps the leading edge of a film as it begins to enter the cassette. The cassette drive forces film downwardly against the frictional resistance exerted by bowed film sections that have been previously inserted into the cassette.

Because both the cassette and film transport drive, at times, drive a single section of film at the same time, it is desirable that the cassette drive is at least as fast or faster than the transport drive so that the film is pulled from the transport rather than pushed into the cassette drive. Accordingly, the override clutch 180 in the transport drive is provided and the gear ratios of the cassette drive are chosen so that the cassette will drive at a slightly higher speed to insure that the film is properly driven when both transport roller and casette drives engage the film.

In an operation of the camera, light from the display face of the monitor is directed along the folded optical path to the output axis 36 and through exposure aperture 90 in the partition plate. Motor 98 is energized to extract film from the spool 84 and to advance the film to position a desired portion of the film over the exposure aperture between the partition plate 80 and cover plate 164. At this time the transport disengaging lever 190 is in its more clockwise position, raising the transport frame and insuring disengagement of the transport rollers. The monitor and its housing and optical system are shifted transversely to position the optical axis and the optical housing output aperture 99 in the appropriate transverse position and the film is exposed. Thereafter, either the monitor and its optical system or the film, or both, are again shifted, in either direction, and another portion of the film is exposed.

As previously mentioned, in choosing certain types of arrays of film images on a section of film, it is desirable to reverse the film drive and move the section of the film being exposed back toward the metering drive. Because the film is relatively stiff and it is not desired to enlarge the camera sufficiently to provide space to handle a slack loop in the film, the film is rewound on the spool during such reverse film drive. To this end, a reverse wind motor 300 is provided to drive the spool and rewind film thereon by means of a belt 302 and drive pulleys 304, 306. Motor 300 is a low power motor that is readily overridden by the more powerful metering drive motor 98 so that whenever the metering drive motor 98 is energized to extract film from the spool, the film will be so extracted regardless of whether or not the rewind motor 300 is energized. In fact, if deemed necessary or desirable, the rewind motor may be operated continuously acting as a brake to insure that film is properly pulled from the roller under the drive of the more powerful motor 98 and its metering rollers 92, 104. Of course, when film is being rewound the motor 98 is reversed and metering rollers 92, 104 are driven in reverse to insure the proper output signal from film position encoder 105.

After all desired images of a group of images are formed on a section of the film, the film may be severed and transported to the storage cassette. Accordingly, the film cutter, which is positioned between the partition exposure aperture 90 and the metering rollers 94, 104 is operated by driving its motor 112 through a single complete revolution.

Upon completion of all image exposures on a single section of film (assuming the last exposure is at a film portion adjacent the cutter) the film is in a position wherein a forward section of the film is between rollers 150 and 152 and their cooperating pressure rollers. However, as previously explained, during the metered film drive and film exposure the entire film transport is in its upwardly pivoted disengaged position so that rollers 150 and 152 do not engage the film. Whenever transport rollers 150, 152 are disengaged, rollers 146, 148 are also disengaged. Because a shorter length of film may be exposed and severed, so that the length of film from its severed edge to its forward or free edge is not sufficient to reach the forward transport rollers 150, 152, the second pair of transport rollers 146 and 148 is provided. Therefore, when the film transporter is lowered to its transport position rollers 146, 148 will grasp the free end of the shorter severed film. Thus, even a much shorter section of film will always contact drive rollers in the course of its path through the camera.

Having completely exposed and severed the film, solenoid 196 is actuated to drive the bifurcated lever 190 counterclockwise lowering the transport frame and allowing the transport rollers to grasp the film edges. Thereafter the independent transport drive motor 132 is energized and the film is driven through the slotted guide paths formed in the exit housing and into the cassette. The cassette drive rollers grasp the forward edge of the cut film and pull the film from the camera housing, pushing the film downwardly into the cassette for storage.

If deemed necessary or desirable, the cassette 230 may be replaced by an automatic film developing or processing arrangement so that each exposed and severed section of film is automatically processed immediately after exposure.

There have been described methods and apparatus for making multiple images on a section of roll film, enabling different types of image arrays and different lengths of image arrays to be made selectively on sections of the film which may be readily severed and handled for immediate processing or storage, as may be desired.

The foregoing detailed description is to be clearly understood as given by way of illustration and example only, the spirit and scope of this invention being limited solely by the appended claims.

What is claimed is:

1. A multiple-image camera comprising
a camera housing,
an oscilloscope mounted to the housing having a screen forming
images to be photographed,
optical means mounted to the housing for transmitting light from the screen along an output axis behind the screen and generally parallel to the screen,
means for transporting film in a first direction perpendicular to said output axis, said means for transporting film comprising
a film spool supply mounted to said housing,
metering drive means for driving film across said output axis,
means for cutting film from said film spool supply, and means for effecting relative shifting of said output axis and said film.

2. The camera of claim 1 wherein said metering drive means includes means for bidirectionally driving film.

3. The camera of claim 1 including film handling means mounted in said housing for driving a section of cut film from said optical axis, said film handling means comprising film gripping means adapted to selectively grip said film, and means for disengaging said film gripping means from said film.

4. The camera of claim 1 including an exit housing section fixed to said camera housing and having a plurality of film guide elements for guiding film driven by said film handling means from said camera housing.

5. The camera of claim 4 wherein said guide elements in said exit housing section include first and second outer guide elements and at least one inner guide element, all of said guide elements having a similar curvature and said inner guide element having a radius of curvature less than the radius of curvature of said first and second outer elements to decrease outward bowing of film being driven past said guide elements.

6. A multiple-image camera comprising
a camera housing,
an oscilloscope mounted to the housing and having a screen forming images to be photographed,
optical means mounted to the housing for transmitting light from the screen along an output axis behind the screen and generally parallel to the screen,
means for transporting film in a first direction perpendicular to said output axis, said means for transporting film comprising
a film spool supply mounted to said housing,
metering drive means for driving film across said output axis,
means for cutting film from said film spool supply, and
means for effecting relative shifting of said output axis and said film,
film handling means mounted in said housing for driving a section of cut film from said optical axis, said film handling means comprising film gripping means adapted to selectively grip said film, and means for disengaging said film gripping means from said film,
comprising a film gripper frame, said film gripping means being mounted on said film gripper frame, means for mounting said frame for movement between a first position in which said gripping means contact said film and a second position in which said gripping means are free of contact with said film, and means for maintaining said gripping means in either one of said first and second positions.

7. The camera of claim 6 wherein said means for moving said frame comprises a lever pivoted to said frame and having a length less than the distance between the pivotal connection of said lever and frame to said housing, and means for pivoting said lever.

8. A multiple-image camera comprising
a camera housing,
an oscilloscope mounted to said housing and having a screen forming images to be photographed,
optical means mounted to said housing for transmitting light from the screen along an output axis behind the screen and generally parallel to the screen,
means for transporting film in a first direction perpendicular to said output axis, said means for transporting film comprising
a film spool supply mounted to said housing,
metering drive means for driving film across said output axis,
means for cutting film from said film spool supply, and
means for effecting relative shifting of said output axis and said film,
film handling means mounted in said housing for driving a section of cut film from said optical axis, said film handling means comprising film gripping means adapted to selectively grip said film, and means for disengaging said film gripping means from said film,
a cut film storage cassette,
means for detachably mounting said cassette to said camera housing, said cassette having a film entrance adjacent said camera housing, and
drive means in said cassette for driving film from said film entrance into said cassette.

9. The camera of claim 8 including motor means for driving said film gripping means, and means for detachably connecting said last mentioned driving means to said cassette drive means.

10. The camera of claim 9 wherein said means for detachably connecting comprises a driven belt mounted in said camera housing and connected to be driven by said motor means, a drive roller mounted in said cassette and connected to drive said cassette drive means, said drive roller and driven belt being mounted for mutual interengagement upon attachment of said cassette to said housing.

11. The camera of claim 8 wherein said cassette entrance includes a film receiving slot, an entrance cover slidably mounted on said cassette for motion between open and closed positions in which it respectively uncovers and covers said film receiving slot, and interengaging means on said camera housing and cassette for driving said cover to open position upon attachment of said cassette to said housing, and means for driving said cover to closed position in response to detachment of said cassette from said housing.

12. The camera of claim 8 wherein said cassette includes first and second side plates and upper and lower ends, said film entrance being positioned adjacent to said upper end, a first sidewall connected to said side plates and extending between said ends and a second sidewall slidably and detachably mounted to said side plates in light sealing relation to provide a light sealed chamber within said cassette, said second sidewall having a lower flange overlying a portion of said lower end wall when said second sidewall is in closed position, and a latch plate slidably mounted to said cassette for movement to a latching and light sealing position in which said latch plate overlies said second sidewall flange to hold said second sidewall in said closed position.

13. A multiple-image camera comprising
a camera housing having a partition plate dividing said housing into first and second chambers, said partition plate having an exposure aperture,
means in said first chamber for forming an image to be photographed,
means for driving film through said second chamber across said aperture, a roll film spool mounted in said camera housing for supplying film to be driven across said aperture through said second chamber, and means for cutting said film at a first end of said second chamber, said film driving means comprising a roll film driver positioned on one side of said aperture and a cut film sheet transporter positioned on the other side of said aperture, and means for selectively engaging and disengaging said cut film transporter from film to be driven thereby.

14. The multiple image camera of claim 13 wherein said cut film sheet transporter comprises a film gripper frame and film gripping means mounted on said frame, said means for selectively engaging and disengaging said transporter comprising a lever pivoted to said frame and having a length less than the distance between the pivotal connection of said lever and said frame to said partition plate.

15. The multiple image of camera 13 including a cut film storage cassette, means for detachably mounting said cassette to said camera housing, said cassette having a film entrance adjacent said camera housing, and means carried by said cassette for driving film from said film entrance into said cassette.

16. The multiple image camera of claim 15 wherein said film driving means in said cassette comprises a driven belt mounted in said camera housing, a drive roller mounted to said cassette, said drive roller and driven belt being mounted for mutual interengagement upon attachment of said cassette to said housing.

17. The method of making multiple images of the display face of a video monitor comprising directing light from the display face along a folded optical path having an output leg positioned behind said display face, extracting film from a film supply roll and moving it longitudinally between the front and back of the monitor in a plane substantially perpendicular to said optical path to leg to intercept said optical path leg, exposing a portion of said film, shifting said film longitudinally of said monitor, effecting relative transverse shifting of said folded optical path leg and said film to position a second portion of said film for exposure, exposing said second portion of film, and cutting the exposed portions of said film from said supply roll.

18. The method of claim 17 including the step of shifting said film longitudinally in a direction opposite the direction of said first mentioned longitudinal shifting to position a third portion of said film for exposure to light in said optical path leg, and exposing said third film portion.

19. The method of claim 17 including the step of grasping exposed film after it has been cut and transporting it from said folded optical path.

20. The method of claim 19 including the step of positioning a forward portion of the film in an area to be grasped by a film transporter but free of contact with said transporter, and maintaining said film free of contact with said transporter during the motion of said film prior to said steps of exposing a portion of said film, and causing said transporter to grasp said film and eject it after it has been exposed.

21. A multiple image camera comprising a camera housing, an oscilloscope having a screen forming images to be photographed, optical means for transmitting light from the screen along an output axis, means for mounting said oscilloscope and optical means in said housing for motion in a first direction transverse to said output axis, and means for moving film in a second direction transverse to said output axis and transverse to said first direction, said means for moving comprising a film spool supply mounted in said housing, metering means for driving film across said output axis, and means for cutting film from said spool supply.

22. The camera of claim 21 including film transport means independent of said metering means for driving a section of cut film from said optical axis.

23. The camera of claim 22 wherein said film transport means comprises film gripping means adapted to selectively grip said film and means for disengaging said film gripping means from said film.

24. The camera of claim 23 including a cut film storage cassette, means for detachably mounting said cassette to said camera housing, and means in said cassette for grasping and driving film inserted into said cassette.

25. The camera of claim 24 including a motor mounted in said camera housing for driving said film transport means, and means for detachably connecting said motor with said film driving means in said cassette.

26. A multiple image roll film camera comprising a housing, an exposure aperture in said housing, means for moving film across said exposure aperture, said film moving means comprising a film spool supply mounted in said housing, and metering means for driving film across said exposure aperture, means for cutting film from said film spool supply, a cut film storage cassette, means for detachably mounting said cassette to said camera housing, said cassette having a film entrance adjacent said camera housing, and means in said cassette for driving film from said film entrance into said cassette.

27. The camera of claim 26 including film transport means mounted in said housing for driving a section of cut film from said exposure aperture, said film transport means comprising film gripping means adapted to selectively grip said film, and means for disengaging said film gripping means from said film.

28. The camera of claim 27 including motor means for driving said film gripping means, and means for detachably connecting said last-mentioned driving means with said cassette drive means.

29. The camera of claim 28 wherein said means for detachably connecting comprises a driven belt mounted in said camera housing, a drive pulley mounted to said cassette, said drive pulley and driven belt being mounted for mutual interengagement upon attachment of said cassette to said housing.

30. The camera of claim 29 wherein said cassette film entrance includes a film receiving slot, an entrance cover slidably mounted on said cassette for motion between open and closed positions, and interengaging means on said camera housing and cassette for driving said cover to open position upon attachment of said cassette to said housing, and means for driving said cover to closed position in response to detachment of said cassette from said housing.

31. A multiple-image camera comprising
a camera housing,
an oscilloscope having a screen forming images to be photographed,
optical means for transmitting light from the screen along an output axis behind the screen and generally parallel to the screen,
means for mounting said oscilloscope and optical means in said housing for motion in a first direction perpendicular to said output axis, and
means for transporting film in a second direction perpendicular to said output axis and to said first direction, said means for transporting film comprising
a film spool supply mounted in said housing,
metering means for reversibly driving film across said output axis,
means for cutting film along a line positioned between said metering drive means and said output axis, and
motor means for rewinding film on said spool supply when film is driven in reverse by said metering drive means, said motor means having less power than said metering drive means.

* * * * *

UNITED STATES PATENT AND TRADEMARK OFFICE
CERTIFICATE OF CORRECTION

PATENT NO. : 4,343,543
DATED : Aug. 10, 1982
INVENTOR(S) : Otto M. Schiff; Vitolds Rikis It is certified that error appears in the above-identified patent and that said Letters Patent are hereby corrected as shown below:

In claim 17 (column 11, line 40), delete the first "to".

Signed and Sealed this

Twenty-third Day of November 1982

[SEAL]

Attest:

GERALD J. MOSSINGHOFF

Attesting Officer     Commissioner of Patents and Trademarks